United States Patent Office 2,701,768
Patented Feb. 8, 1955

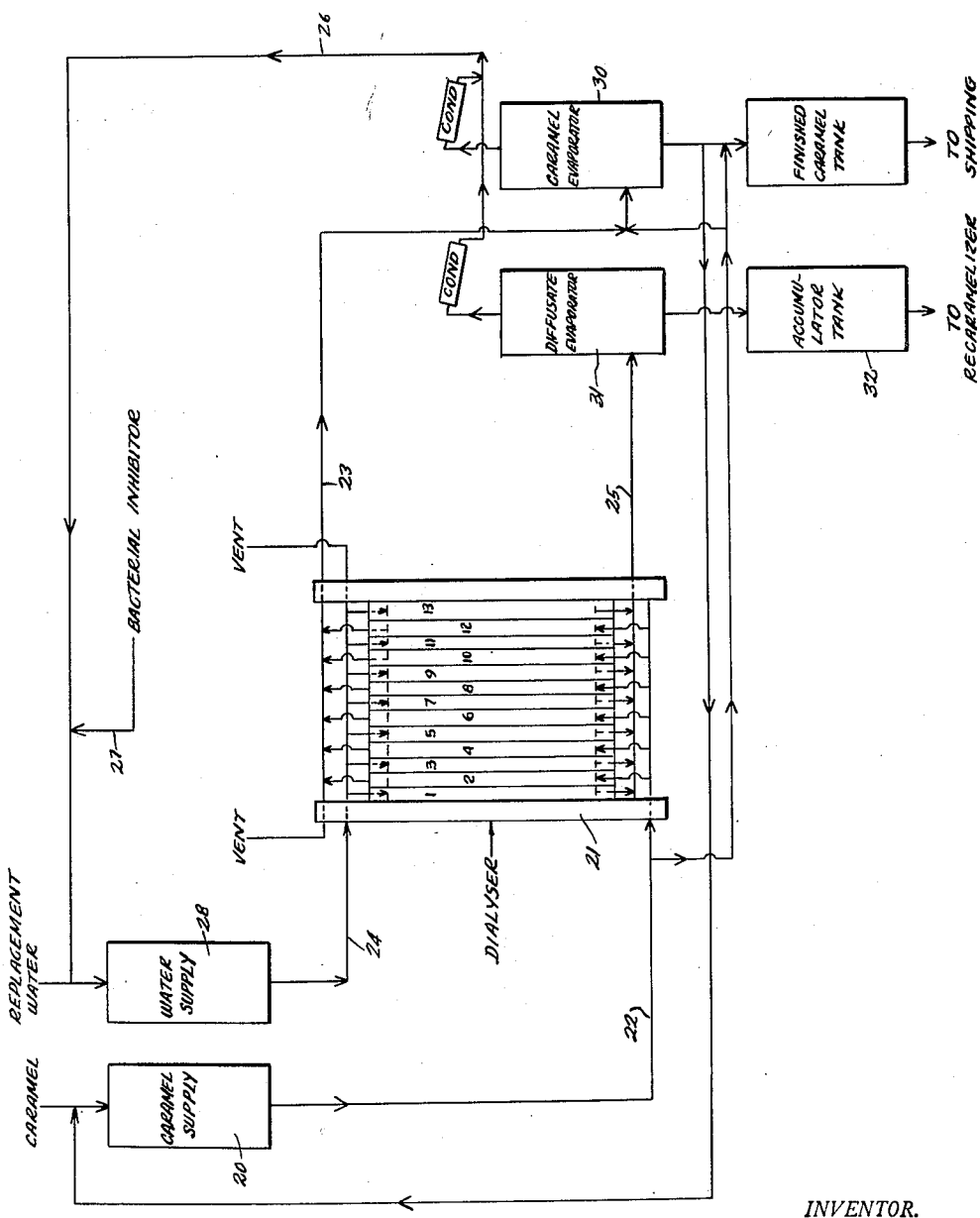

2,701,768

MANUFACTURE OF HIGH TINCTORIAL POWER CARAMEL COLOR AND THE RESULTING PRODUCT

James E. Cleland, Granite City, and Lyman Reese Shively, Wood River, Ill., assignors to Union Starch & Refining Company, Columbus, Ind., a corporation of Indiana Application February 19, 1952, Serial No. 272,468

6 Claims. (Cl. 99—148)

This invention relates to a method of producing a concentrated caramel color of good acid stability and more particularly deals with a method in which a commercial caramel color is refined or purified by application of dialysis.

According to the invention a separation is made of the color imparting compounds which are in colloidal solution from the residual sugars and other constituents in true solution. Dialysis is carried out against water and the substances in true solution are allowed to pass through a suitable semi-permeable membrane, whereupon they are recovered, refined and reused to make additional caramel color. The colloidal constituents retained by the membrane are concentrated by evaporation to make a novel caramel color of very high tinctorial power. This is the major objective of the invention.

Another principal objective of the invention is the recovery of the residual sugars from ordinary commercial caramel colors as a source of additional raw material whereby the yield of actual coloring compounds can be increased by reprocessing.

Various additional objectives of the invention will appear in the disclosure or will be obvious to those skilled in the art.

Burnt sugar coloring or caramel color is made commercially by subjecting sugars to heat in the presence of various catalysts, usually salts of ammonia, until a maximum practical quantity of sugar is converted into color imparting compounds. These compounds are not well defined as to chemical structure but are known to be of much higher molecular weight than the original sugars and are colloidal in their characteristics. Methods of caramelization differ quite widely in respect to apparatus, heating time, temperature, starting materials, catalysts, etc., but the end results are surprisingly similar. Different types are defined and widely recognized as the various properties are easily evaluated in respect to colloidal character, etc., but they all have certain characteristics in common. One of the outstanding features of all commercial caramel colors is that they contain substantial quantities of carbohydrates still exhibiting the characteristics of soluble crystalloids and not contributing to the coloring power. These carbohydrate mixtures are composed largely of modified sugars, dehydrated and polymerized in varying degrees and run the whole range from caramel color to unchanged sugars. These modified and residual sugars serve no useful purpose in a caramel color and are deleterious because they merely serve to dilute the color bodies or compounds of primary interest. In other words the unused sugars or incompletely caramelized sugars may serve to add solids to the product but cannot be utilized to perform the normal function of sugars in respect to flavor because they have been sufficiently modified to have an acrid or burnt taste. In addition, they are unclassified as to nutritional status. Any of the caramel color solutions which contain such carbohydrates exhibiting the characteristics of soluble crystalloids may be employed as the raw material of the present invention.

The caramel colors of commerce are liquids ordinarily of about 36 to 38° Bé. although a small proportion is dried to a powder. As the latter is very hygroscopic it is not popular in the trade. At 38° Bé. (60° F.) the ordinary caramel color has about 70% solids. Standard tinctorial power of commercial caramel color of acid proof varieties in this country will average about 24 units when measured in concentration of 0.1% (1.00 grams of 38° Bé. color in 1000 ml.) in a one inch cell against Series No. 52 Lovibond tintometer slides. In exceptional cases the coloring power, usually described in the trade as "tinctorial power," may range as low as 20 and as high as 30 units. One variety commonly tests 30 units but it is not considered as acid proof beverage type and has different colloidal properties. A surprising feature of all these colors of 36–38° Bé., 20 to 30 tinctorial power and having 66 to 70% solids, is the small proportion of total solids actually responsible for the coloring ability. The latter resides almost entirely in the colloidal disperse phase and this constitutes only about 20 to 30% of the total weight or about 30 to 43% of the solids. In other words the color bodies or color imparting compounds have relatively enormous coloring ability or tinctorial power and the high percentage of crystalloid diluents bring this down to the characteristic 20 to 30 units observed in commercial caramel colors. It would, of course, be advantageous to increase the tinctorial power to much higher levels in order to save freight charges, containers, and handling but the characteristic range is imposed by inherent processing limitations related to burning. No method of burning yet devised will serve to utilize all the sugars and convert them to color bodies in yields approaching theoretical without encountering unmanageable viscosities, excessive carbonization, instability and other serious difficulties. It has been found that about 30 T. P. is the upper limit for any known straight burning process if satisfactory shelf life and stability are to be guaranteed.

We have discovered that if the colloidal disperse phase or color bodies can be separated from the uncaramelized carbohydrates the latter can be caramelized very satisfactorily to make more color. If this procedure is repeated several times the entire raw material supply can be converted into caramel color and the yields are much improved in the order of 2 or 3 times the usual level. An even greater advantage is that the product resulting is of much greater coloring power per unit weight and when dried may exceed the ordinary varieties in this respect four or five fold. Also the dried product does not have the objectionable hygroscopic properties of products produced by drying a color solution containing large amounts of non color carbohydrates.

From the above description it is seen that the major components of ordinary caramel color are highly polymerized compounds of great tinctorial power that exist in a state of colloidal dispersion, with sugars and variously modified sugars existing in a state of true solution. We have discovered that when caramel color is subjected to dialysis under the conditions to be described, the components existing in true solution, i. e. the unused sugars or modifications or both, will pass through the membrane while the color bodies, in the colloidal state, will be retained. This separation is very sharp with suitable membranes and can be controlled so that only a negligible quantity of color escapes with the crystalloids.

In conducting this process we have found that any of the well known types of industrial continuous dialysis equipment can be used to advantage. We prefer the kind in which the membranes are placed in frames arranged in the manner of a plate and frame filter press with manifolds so devised that alternate cells contain water and solution flowing continuously and countercurrently. Cellophane, parchment and ceramic membranes have been used successfully in our process and the selection of the most suitable type is governed largely by considerations of speed.

While standard industrial dialysis equipment or any other satisfactory type may be used to conduct the process and while no uncommon membranes are essential it is pointed out that certain modifications and precautions are recommended for efficient conduct of our process. If caramel color is merely subjected to countercurrent dialysis against water, for instance, in an apparatus similar to the one above described, it will be found that the separation is very slow, the membranes tend to foul up quickly and microbiological activity sets in to ruin the products. It might be reasoned that the fouling of membranes and spoilage could be eliminated by addition of preservatives and something can be accomplished by this means, to be sure, but one must remember that a food product is being processed and few effective preservatives are permissable even with label declaration if they remain in the final product. We have discovered that adjustment of pH with food acids is of some effectiveness but have devised means of eliminating the problem in large measure by the process described below.

We have discovered that it is highly desirable in several ways to keep the caramel color solution above certain levels of concentration at all times while dialysis is proceeding. This speeds the process as the ingress of water through the membrane is faster against the concentrated solution and the spoilage problem is virtually eliminated in this area and on the surfaces contacted by the caramel color. This concentration is maintained by drawing the caramel color to an evaporator either at predetermined time intervals on a batch basis or continuously and returning to the system on the same basis. It it found desirable to maintain this concentration within the limits 50 to 75% solids. The condensate from this evaporator is returned to the water side through the appropriate dialyzer manifold.

As the diffusate cannot be built up to high levels of concentration without slowing down the process it is not possible to apply this method of controlling the action of microorganisms as on the other side of the membrane. We have discovered, however, that the use of a fairly wide variety of bacterial inhibitors is applicable here because the subsequent reprocessing of the recovered carbohydrates can be so conducted as to remove them and they do not appear in the finished caramel color. It is possible, for instance to use chloride, chlorine dioxide, nitrogen dioxide and other bactericidal gaseous compounds by feeding them into the water channel. These can be removed readily in the subsequent processing when the sugars are reclaimed and reprocessed to make caramel color.

It has been found desirable to draw a sufficient proportion of the diffusate to an evaporator and return the condensate to the system so as to hold the solids in the diffusate to a level of about 10° Brix.

The foregoing and other objects of the invention will be best understood from the following description of exemplifications of the same when read in connection with the accompanying drawing in which the figure represents a flow sheet of a typical application of the process.

In this figure the caramel is supplied from storage tank 20 and is fed directly to the dialyzer 21 having 13 cells. The caramel color passes into dialyzer 21 through line 22 and the concentrated color containing an increased water content is passed out of dialyzer 21 through line 23. The water passes into dialyzer 21 through line 24 and the water plus noncolor carbohydrates which constitute the diffusate pass out of dialyzer through line 25.

The purified caramel color dispersion or solution is concentrated in evaporator 30 and the condensed water obtained from the evaporation is returned to the system through line 26.

The diffusate is concentrated in evaporator 31 and then stored in tank 32. Water obtained by condensation from evaporator 31 is returned to the system through line 26 and stored in tank 28. The bacterial inhibitor may be added at any point but it is shown as being added to line 26 at point 27.

The following example of the operation of our process is given by way of illustration but is not to be construed in a limiting sense.

*Example*

A commercial, acidproof, beverage type of caramel color (negatively charged colloidal color bodies) of 30 tinctorial power and 38° Bé. (70% solids) was fed to a plate type dialyzer under constant head at a rate of about 2 gallons per min. The dialyzer was equipped with 14 plates and the semi-permeable membrane used was #50 de-nitrated nitrocellulose. The 14 plates bounded 13 cells in the dialyzer. The feeding manifolds were so arranged that 7 of these were filled with the caramel color and were interconnected through the ports so a continuous flow was maintained through the seven cells. Water flowed through the six remaining cells but in the opposite direction and at a rate of 8 G. P. M. or 4 times that of the caramel color. This countercurrent flow was maintained in a closed circuit for 2 hours and it was found that the volume of the caramel color had appreciably expanded in the feeder head tank with corresponding decrease in solids. At that point a portion of the caramel color was diverted to the continuous evaporator at the rate of about 0.5 G. P. M. and returned to the system. The flow rates and boiling were then manipulated until the solids of the caramel color were maintained between 50 and 60% in the head tank. The condensate from the evaporator went back to the diffusate and $Cl_2$ was fed into it from a cylinder of the gas.

When the solids of the diffusate had built up to about 10° Brix (about 6 hours) a slow withdrawal was begun, about 0.2 G. P. M., to an evaporator. The solids were concentrated to 45° Bé. in this step and withdrawn from the system to an accumulator tank for eventual recaramelization when a batch volume had been built up. The condensate was returned to the diffusate. It was necessary to add some fresh water to make up losses.

When the caramel color in the head tank had reached a tinctorial power of 44 units (about 12 hours) the dialysis was stopped and all of the caramel color was removed from the system. The solids content was about 54%.

All of the diffusate was then drawn to the evaporator and concentrated to 45° Bé. It was found that the caramel color has lost about 2 lbs. of solids from each gallon processed and this was available for recaramelization in the 45° Bé. concentrate of the diffusate. This operation was performed and the resulting caramel color blended with new material (50–50) for another dialysis run. When a sufficient backlog of concentrated diffusate is built up the operation of dialysis need be interrupted only long enough to drop the load of finished material and refill with fresh supplies. The diffusate can be treated with activated carbon or other refining agents to remove preservatives, etc., before evaporation.

It was found that higher temperatures speeded up the dialysis but tended to pass more color thru the membrane. A compromise was made by allowing the condensates to return at about 120° F.

It will be obvious to all skilled in the art that many changes are possible in the above cited example of operation without departure from the scope or spirit of the invention. Temperatures, flow rates, bacterial inhibitors, membranes, and many other factors can be manipulated to give various advantages but the essential objective is to produce a novel caramel color of acceptable quality in a commercially efficient manner and of exceptional tinctorial power. In other words this increase in tinctorial power from a given amount of starting sugars must be sufficient to pay for the additional expense of the process outlined. Hence it is intended that all matter contained in the description shall be construed as merely illustrative and not in a limiting sense.

Having described our invention, what we claim as new and desire to secure by Letters Patent is:

1. In the process of manufacturing a caramel color composition comprising the steps of providing a caramel color solution having a tinctorial power of between 18 and 35 Lovibond units and consisting essentially of color imparting polymers of colloidal character and residual uncaramelized carbohydrates, dialyzing said caramel color solution against water and through a membrane to separate the soluble uncaramelized carbohydrates from the solution containing the color imparting polymers of colloidal character, concentrating the resultant color containing solution to provide a novel caramel color of tinctorial power above 40 units and recovering the carbohydrates from said diffusate.

2. In the process of manufacturing a caramel color composition comprising the steps of providing a caramel color solution having a tinctorial power of between 18 and 35 Lovibond units, a solid concentration of 50–75% and consisting essentially of color imparting polymers of colloidal character and residual uncaramelized crystalloidal carbohydrates, dialyzing said caramel color solution against water and through a membrane to separate the soluble uncaramelized carbohydrates from the solution containing the color imparting polymers of colloidal character, and maintaining the solution being dialyzed at a solids concentration of at least 50%

3. In the process of manufacturing a caramel color composition comprising the steps of providing a caramel color solution having a tinctorial power of between 18 and 35 Lovibond units, a solid concentration of 50–75% and consisting essentially of color imparting polymers of colloidal character and residual uncaramelized crystalloidal carbohydrates, dialyzing said caramel color solution against water and through a membrane to separate the soluble uncaramelized carbohydrates from the solution containing the color imparting polymers of colloidal character, and withdrawing diffusate and adding water at such a rate that the solids concentration of said diffusate does not rise above 20% and adding a non-toxic, gaseous bacterial inhibitor to said diffusate liquid.

4. The process as set forth in claim 3 in which the bacterial inhibitor is one which is easily removable from the diffusate.

5. In the process of manufacturing a caramel color composition comprising the steps of providing a caramel color solution having a tinctorial power of between 18 and 35 Lovibond units, a solid concentration of 50–75% and consisting essentially of color imparting polymers of colloidal character and residual uncaramelized crystalloidal carbohydrates, dialyzing said caramel color solution against water and through a membrane to separate the soluble uncaramelized carbohydrates from the solution containing the color imparting polymers of colloidal character, maintaining the solution being dialyzed at a solids concentration of at least 50% and withdrawing diffusate and adding water at such a rate that the solids concentration of said diffusate does not rise above 20% and adding a non-toxic, gaseous bacterial inhibitor to said diffusate liquid.

6. A caramel color having a coloring power of at least 40 units (Lovibond) as made by the process of claim 1.

References Cited in the file of this patent

UNITED STATES PATENTS 2,533,221    Cleland et al. _____ Dec. 12, 1950